(12) United States Patent
Hearley (10) Patent No.: US 11,472,902 B2
(45) Date of Patent: Oct. 18, 2022

(54) ENVIRONMENTALLY FRIENDLY AQUEOUS COATING COMPOSITION

(71) Applicant: SWIMC LLC, Cleveland, OH (US)

(72) Inventor: Andrew Hearley, Hendrik-Ido-Ambacht (NL)

(*) Notice: Subject to any disclaimer, the term of this patent is extended or adjusted under 35 U.S.C. 154(b) by 368 days.

(21) Appl. No.: 16/484,724

(22) PCT Filed: Feb. 8, 2018

(86) PCT No.: PCT/US2018/017393
§ 371 (c)(1),
(2) Date: Aug. 8, 2019

(87) PCT Pub. No.: WO2018/148388
PCT Pub. Date: Aug. 16, 2018

(65) Prior Publication Data
US 2020/0024460 A1 Jan. 23, 2020

Related U.S. Application Data

(60) Provisional application No. 62/456,383, filed on Feb. 8, 2017.

(51) Int. Cl.
| | | |
|---|---|---|
| C08F 220/10 | (2006.01) | |
| C08F 2/22 | (2006.01) | |
| C08F 212/08 | (2006.01) | |
| C08F 216/02 | (2006.01) | |
| C08F 216/34 | (2006.01) | |
| C08F 216/36 | (2006.01) | |
| C08F 220/06 | (2006.01) | |
| C08F 220/14 | (2006.01) | |
| C09D 5/02 | (2006.01) | |
| C09D 5/44 | (2006.01) | |
| C08F 220/34 | (2006.01) | |
| C08F 220/18 | (2006.01) | |
| C08F 222/10 | (2006.01) | |
| C08F 230/08 | (2006.01) | |

(52) U.S. Cl.
CPC ............ *C08F 220/10* (2013.01); *C08F 2/22* (2013.01); *C08F 212/08* (2013.01); *C08F 216/02* (2013.01); *C08F 216/34* (2013.01); *C08F 216/36* (2013.01); *C08F 220/06* (2013.01); *C08F 220/14* (2013.01); *C09D 5/022* (2013.01); *C09D 5/4411* (2013.01); *C08F 220/1804* (2020.02); *C08F 220/343* (2020.02); *C08F 222/102* (2020.02); *C08F 230/085* (2020.02); *C08F 2810/00* (2013.01)

(58) Field of Classification Search
None
See application file for complete search history.

(56) References Cited

U.S. PATENT DOCUMENTS

| | | | | |
|---|---|---|---|---|
| 4,904,724 A | * | 2/1990 | Auchter | C08F 285/00 524/458 |
| 5,962,571 A | * | 10/1999 | Overbeek | C08F 8/30 428/460 |
| 6,355,720 B1 | * | 3/2002 | Canard | C08L 51/003 524/501 |
| 7,812,090 B2 | * | 10/2010 | Killilea | C08F 220/18 524/818 |
| 8,141,599 B2 | | 3/2012 | Korenkiewicz et al. | |
| 9,284,467 B2 | | 3/2016 | Booth et al. | |
| 9,951,169 B2 | * | 4/2018 | Yang | C08L 33/02 |
| 10,597,553 B2 | * | 3/2020 | Akkerman | C08F 220/18 |
| 2003/0088014 A1 | * | 5/2003 | Edwards | C08L 51/003 524/502 |
| 2003/0207121 A1 | | 11/2003 | McGee | |
| 2014/0005322 A1 | * | 1/2014 | Akkerman | C08G 18/6254 524/501 |
| 2017/0275408 A1 | * | 9/2017 | Yang | C08F 230/02 |
| 2020/0157375 A1 | * | 5/2020 | Akkerman | C08F 220/28 |

FOREIGN PATENT DOCUMENTS

| | | |
|---|---|---|
| CA | 2066988 | 10/1992 |
| CN | 102351982 A | 2/2012 |
| CN | 101665556 B | 9/2012 |
| CN | 102656201 A | 9/2012 |
| CN | 103443146 A | 12/2013 |

(Continued)

OTHER PUBLICATIONS

Chinese Patent Application No. 201880010835.1, filed Aug. 8, 2019; Second Office Action and Search Report dated Sep. 30, 2021, including Summary of Second Office Action (English Translation), 20 pages.
Zhu Wanqiang, "Coating Basic Course," $1^{st}$ edition, Jun. 30, 2012, Southwest Jiaotong University Press, title page, publishing information page, and pp. 16-17. No translation provided. See Search Report and Summary of Second Office Action in Chinese Patent Application No. 201880010835.1 for relevance.
International Patent Application No. PCT/US2018/017393, filed Feb. 8, 2018, International Search Report and Written Opinion dated Mar. 22, 2018, 11 pages.
International Patent Application No. PCT/US2018/017393, filed Feb. 8, 2018, International Preliminary Report on Patentability dated Aug. 13, 2019, 9 pages.
Commission Decision (EU) 2016/397 of Mar. 16, 2016 amending Decision 2014/312/EU establishing the ecological criteria for the award of the EU Ecolabel for indoor and outdoor paints and varnishes. 14 pages.

(Continued)

*Primary Examiner* — Christopher M Rodd
(74) *Attorney, Agent, or Firm* — Mueting Raasch Group (57) ABSTRACT

An aqueous emulsion is made by emulsion polymerizing at least one free-radically polymerizable monomer and one or more di- or higher-functional chain-extending monomers in the presence of an aqueous solution of an oligomer made from a mixture of free-radically polymerizable monomers including acid-functional free-radically polymerizable comonomers, adhesion-promoting free-radically polymerizable comonomers and other free-radically polymerizable comonomers. The aqueous emulsion is substantially free of adipic dihydrazide, has a minimum film forming temperature≤55° C., and on drying has a Koenig hardness of at least 40 sec.

22 Claims, 1 Drawing Sheet

(56) References Cited

FOREIGN PATENT DOCUMENTS

| CN | 103459432 A | 12/2013 | |
|---|---|---|---|
| CN | 103834037 A | 6/2014 | |
| CN | 102574936 B | 7/2014 | |
| CN | 103998472 A | 8/2014 | |
| CN | 106221546 A | 12/2016 | |
| CN | 109153739 A | 1/2019 | |
| EP | 587333 A2 * | 3/1994 | ............ C08F 265/02 |
| EP | 0 758 364 B1 | 9/1998 | |
| EP | 0 989 163 A1 | 3/2000 | |
| EP | 2 024 412 B1 | 7/2010 | |
| WO | 95/04767 | 2/1995 | |
| WO | WO 95/29963 A1 | 11/1995 | |
| WO | WO 2011/073417 A1 | 6/2011 | |
| WO | WO 2012/130817 A1 | 10/2012 | |

OTHER PUBLICATIONS

Chinese Patent Application No. 201880010835.1, filed Feb. 8, 2018, Search Report dated Apr. 2, 2021; 2 pages.

" 高分子光化学原理及应用 ", edition 1, 李善君 等, p. 192-193. 复旦大学出版 社. Published Jan. 31, 1998, cited in Search Report for Chinese Patent Application No. 201880010835.1 dated Apr. 2, 2021. No translation provided.

Neocryl® XK-98 Product Data Sheet, Jul. 2018, DSM, 5 pages. Earlier product data believed to be available at least as early as 2012.

* cited by examiner

ENVIRONMENTALLY FRIENDLY AQUEOUS COATING COMPOSITION

CROSS REFERENCE TO RELATED APPLICATIONS

This application is a national stage filing under 35 U.S.C. § 371 of International Application No. PCT/US2018/017393 filed on Feb. 8, 2018 and entitled "ENVIRONMENTALLY FRIENDLY AQUEOUS COATING COMPOSITION", which claims priority to U.S. Provisional Application No. 62/456,383 filed on Feb. 8, 2017 and entitled "ENVIRONMENTALLY FRIENDLY AQUEOUS COATING COMPOSITION", the disclosures of both of which are incorporated herein by reference in their entirety.

FIELD

This invention relates to waterborne paints and varnishes.

BACKGROUND

Waterborne paints and varnishes are used to coat a variety of industrial and consumer products including furniture, wood trim, windows and other objects. The cured or hardened coating must satisfy a variety of performance requirements, including adhesion to the substrate, resistance to fluids, and resistance to blocking (adhesion of the coating to itself) when coated surfaces contact one another under pressure. Adipic acid dihydrazide (ADH) is a widely-used adhesion promoter and crosslinker present in many paints and varnishes. Unfortunately, even when crosslinked into a coating, ADH has a tendency to hydrolyze, and the hydrolysis byproducts can leach into surrounding areas. In 2014, ADH was classified in Europe as being hazardous to the aquatic environment (Chronic Category 2) with associated hazard statement H411 (Toxic to aquatic life with long-lasting effects), see Commission Decision (EU) 2016/397 of 16 Mar. 2016. Based however on arguments from industry that equally efficient and effective alternatives to ADH were not yet available on the market, the same Commission Decision granted a derogation for the use of ADH in EU Ecolabel paints and varnishes "in situations where it is not technically feasible to use alternative materials because the paint product would not provide the required levels of functionality to the consumer." ADH consequently continues to be used in such paints and varnishes.

NEOCRYL™ XK-98 self-crosslinking acrylic emulsion polymer is a widely-used ADH-containing waterborne binder used in a number of paint and varnish products, and is believed to be similar to polymers described in European Patent No. EP 0 758 364 B2. Several suppliers, including Alberdingk Boley and Allnex (formerly NuPlex), now make similar acrylic emulsion products believed to contain ADH. It would be desirable to replace these products with an ADH-free system having comparable or better performance and a lower potential to harm the environment.

Accordingly, it will be appreciated that what is needed in the art are improved, ADH-free acrylic emulsion polymers and waterborne paint and varnish systems. Such systems are disclosed and claimed herein.

SUMMARY OF THE INVENTION

The present invention provides, in one aspect, a method for making an aqueous emulsion, which method comprises:

a) oligomerizing a mixture of free-radically polymerizable monomers in aqueous solution, the mixture including 1 to 45 wt. % acid-functional free-radically polymerizable comonomers, 0.5 to 20 wt. % adhesion-promoting free-radically polymerizable comonomers, and 98.5 to 50 wt. % other (viz., non-acid-functional and non-adhesion-promoting) free-radically polymerizable comonomers, to form a water-soluble oligomer having a number average molecular weight (Mn) of 500 to 50,000 and a glass transition temperature (Tg) of at least 70° C., the acid-functional comonomers rendering the oligomer water-soluble per se or by neutralization and the adhesion-promoting comonomers imparting improved adhesion to a wood, plastic, metal or cementitious substrate when a coating composition containing the aqueous emulsion is applied and dried on such substrate, b) emulsion polymerizing, in the presence of an aqueous solution of the oligomer, at least one free-radically polymerizable monomer and 0.1 to 20 wt. %, based on the weight of free-radically polymerizable monomer(s), of one or more di- or higher-functional chain-extending monomers, to form an aqueous emulsion of a hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide, has a minimum film forming temperature (MFFT)≤55° C. and on drying has a Koenig hardness of at least 40 sec.

The above-mentioned di- or higher-functional chain-extending monomers may in some embodiments serve as intra-molecular crosslinking monomers. In the interest of brevity, such monomers will be referred to as chain-extending monomers without regard to the particular role or roles they may perform when a particular aqueous emulsion is formed.

In another aspect, the present invention provides a coating composition comprising an aqueous emulsion of a hydrophobic polymer made from at least one free-radically polymerizable monomer and 0.1 to 20 wt. %, based on the weight of free-radically polymerizable monomer(s), of one or more di- or higher-functional chain-extending monomers, the hydrophobic polymer having been emulsion polymerized in the presence of an aqueous solution of an oligomer made from a mixture of free-radically polymerizable monomers in aqueous solution, the mixture including 1 to 45 wt. % acid-functional free-radically polymerizable comonomers, 0.5 to 20 wt. % adhesion-promoting free-radically polymerizable comonomers, and 98.5 to 50 wt. % other free-radically polymerizable comonomers, the acid-functional comonomers rendering the oligomer water-soluble per se or by neutralization and the adhesion-promoting comonomers imparting improved adhesion to a wood, plastic, metal or cementitious substrate when the coating composition is applied and dried on such a substrate, the oligomer having an Mn of 500 to 50,000 and a Tg of at least 70° C., and the hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide, has an MFFT≤55° C. and on drying has a Koenig hardness of at least 40 sec.

In yet another aspect, the present invention provides a coated article comprising a substrate (e.g., a wood, plastic, metal or cementitious substrate) having thereon a layer of a coating composition comprising an aqueous emulsion of a hydrophobic polymer made from at least one free-radically polymerizable monomer and 0.1 to 20 wt. %, based on the weight of free-radically polymerizable monomer(s), of one or more di- or higher-functional chain-extending monomers, the hydrophobic polymer having been emulsion polymerized in the presence of an aqueous solution of an oligomer made from a mixture of free-radically polymerizable monomers in aqueous solution, the mixture including 1 to 45 wt. % acid-functional free-radically polymerizable comonomers, 0.5 to 20 wt. % adhesion-promoting free-radically polymerizable comonomers, and 98.5 to 50 wt. % other free-radically polymerizable comonomers, the acid-functional comonomers rendering the oligomer water-soluble per se or by neutralization and the adhesion-promoting comonomers imparting improved adhesion to the substrate when the coating composition is dried, the oligomer having a number average molecular weight Mn of 500 to 50,000 and a glass transition temperature Tg of at least 70° C., and the hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide, has an MFFT≤55° C. and on drying has a Koenig hardness of at least 40 sec.

DETAILED DESCRIPTION

The following detailed description describes certain embodiments and is not to be taken in a limiting sense. All weights, amounts and ratios herein are by weight, unless otherwise specifically noted. The terms shown below have the following meanings:

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The term "acrylic monomers" includes monomers containing or derivable from acrylic or methacrylic acid.

The term "binder" means a natural or synthetic polymer suitable for use in paints and other coating compositions to form dried, cured or otherwise hardened coatings in which the binder may represent a continuous phase.

The term "carrier" means a volatile aqueous or organic liquid solvent or dispersant that can be used to prepare paints and other coating compositions containing suspended pigments and other suspended solid particulate materials.

The term "comonomer" when used with respect to a free-radically polymerizable monomer refers to a monomer that in the presence of suitable reaction conditions, including where needed an appropriate initiator, undergoes free radical copolymerization with one or more other free-radically polymerizable monomers.

The term "di- or higher-functional chain-extending monomer" means a monomer having at least two sites (e.g., a vinyl group, vinyl ether group, ethylenically unsaturated site, allyl group or combination thereof) that can react during a free radical polymerization reaction to extend a growing polymer chain or bridge two growing polymer chains.

The term "film-forming" when used in reference to a binder means that a solution or dispersion of the binder can be coated in a thin wet layer (e.g., of about 150-200 μm thickness) on a suitable support, and dried, cured or otherwise hardened (if need be with the aid of a suitable coalescent) to form over the support a substantially continuous dry film coating layer (e.g., of about 75-100 μm thickness) containing the polymer.

The term "emulsion polymer" when used with respect to a waterborne particulate polymer means the polymer is not itself normally dispersible into water; rather, an emulsion polymer requires the presence of a secondary emulsifying agent (e.g., the above-described oligomer or a surfactant, present during emulsion polymerization) to create an emulsion of the polymer particles in water.

The term "free-radically polymerizable" when used with respect to a monomer or comonomer refers to a monomer or comonomer that in the presence of suitable reaction conditions, including where needed an appropriate initiator, undergoes free radical polymerization with one or more other such free-radically polymerizable monomers. Exemplary free-radically polymerizable monomers and comonomers may for example include one or more vinyl groups, vinyl ether groups, ethylenically unsaturated sites, allyl groups, and the like.

The term "low VOC" when used with respect to colorants, paints and other coating compositions means that the colorant or coating composition contains less than about 50 g/L volatile organic compounds. VOC levels may be measured using ASTM D6886-14 with methyl palmitate as the boiling point marker.

The term "(meth)acrylic acid" includes either or both of acrylic acid and methacrylic acid, and the term "(meth)acrylate" includes either or both of an acrylate and a methacrylate. Similar usage is employed for other derivatives of acrylic acid and methacrylic acid, e.g., (meth)acrylamide, (meth)acrolein and so on.

The term "monomer" means a reactive organic molecule that can bond covalently to other molecules or to itself to form an oligomer or a polymer containing a plurality of units (e.g., a plurality of repeating units) derived from the monomer.

The term "oligomer" means a molecule of intermediate relative molecular mass, the structure of which essentially contains a plurality of units derived, actually or conceptually, from molecules of lower relative molecular mass.

The terms "polymer" and "polymeric" mean a molecule of high relative molecular mass, the structure of which essentially contains multiple repetitions of units derived, actually or conceptually, from molecules of low relative molecular mass.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "solvent-borne" when used with respect to an aqueous emulsion or coating composition means that the major liquid vehicle or carrier for such aqueous emulsion or coating composition is a nonaqueous solvent or mixture of nonaqueous solvents.

The term "substantially free of" when used with respect to a component which may be found in an aqueous emulsion or coating composition, means containing less than about 5 wt. % of the component based on the total aqueous emulsion or coating composition weight.

The term "vinyl" when used with respect to an organic group refers to a moiety having the formula —CH=CH$_2$—.

The term "water-borne" when used with respect to an aqueous emulsion or coating composition means that the major volatile liquid vehicle or carrier for such aqueous emulsion or coating composition is water.

The term "water-dispersible" when used with respect to an oligomer or polymer means the oligomer or polymer is itself capable of being dispersed into water without requiring the use of a separate surfactant, or water and if need be external acids or bases can be added to the oligomer or polymer, to form a stable dispersion at normal storage temperatures. Water-dispersible oligomers or polymers may include nonionic or anionic functionality on the oligomer or polymer to assist in rendering the oligomer or polymer water-dispersible. For such oligomers or polymers, external acids or bases are typically required for such dispersion; however, these are not considered to be secondary emulsifying agents (e.g., surfactants) such as are used to disperse a water-insoluble latex polymer into water.

A variety of acid-functional free-radically polymerizable comonomers may be used to make the disclosed water-soluble oligomer. The acid-functional comonomer(s) render the oligomer at least partially water-soluble in the aqueous solution in which the oligomerization reaction is performed. By this is meant that the oligomer is either completely or substantially completely dissolved in the aqueous solution so that it is present as a true (viz., clear) solution or that some of the oligomer is dispersed in the aqueous medium and some of it is dissolved therein. The recited water solubility occurs per se or by neutralization. Thus, the acid-functional oligomer contains a sufficient concentration of acidic groups to render the oligomer partially or more preferably fully soluble in aqueous media, if necessary by neutralization of acidic groups, as would for example be achieved by adjustment of the aqueous medium pH. Usually, the medium in which the oligomer finds itself (typically the aqueous polymerization medium in which the oligomer has been prepared) will be acidic with a pH <7. Also, the acidic groups typically will be carboxyl groups. Under such circumstances, if dissolution does not take place per se then it may be accomplished by raising the pH of the medium so as to neutralize the acidic groups. This typically may be done by adding a base, e.g., an organic or inorganic base, examples of which include organic amines such as trialkylamines (e.g., triethylamine and tributylamine), morpholine and alkanolamines, and inorganic bases such as ammonia, NaOH, KOH, and LiOH. In some embodiments, the aqueous medium containing the acid-functional oligomer may already be alkaline or sufficiently alkaline such that the acidic groups (e.g., carboxyl groups) become neutralized without having to add a base to raise the pH. In some embodiments, the acidic groups may be or may include very strong acidic groups such as sulfonic acid groups (having for example a pKa of 1 to 2) for which neutralization may not be needed to achieve dissolution. In some embodiments, the acid-functional free-radically polymerizable comonomers may be polymerized in a salt form rather than as the free acid. The acid functionality may be present in the acid-functional comonomer as supplied, or may be an acid-forming group which yields, or is subsequently convertible to, an acidic group (such as an anhydride, e.g. methacrylic anhydride or maleic anhydride, or an acid chloride).

Typically, the acid-functional free-radically polymerizable comonomers will include one or more acidic sites and one or more free-radically polymerizable sites. Exemplary acid-functional free-radically polymerizable comonomers include acrylic monomers and other ethylenically unsaturated carboxyl-bearing monomers, such as acrylic acid, methacrylic acid, itaconic acid and fumaric acid. Sulfonic acid-bearing monomers may also be used, such as styrene p-sulfonic acid (or correspondingly styrene p-sulfonyl chloride), The acid-functional free-radically polymerizable comonomers may be polymerized as a salt or as the free acid, e.g., the $NH_4^+$ or alkali metal salts of ethylmethacrylate-2-sulfonic acid or 2-acrylamido-2-methylpropane sulfonic acid, or their corresponding free acid.

A variety of adhesion-promoting olefinically unsaturated comonomers may be used to make the disclosed water-soluble oligomer. Exemplary such comonomers typically will include one or more (usually one) groups having an affinity for the intended substrate and one or more (usually one) free-radically polymerizable sites. The groups having an affinity for the substrate may for example be a polar group such as an aldehyde, ketone, ester, hydroxyl, silane, ureido, or other group capable of imparting improved adhesion to the intended substrate (e.g., a wood substrate) when a coating composition containing the aqueous emulsion is applied and dried on such a substrate. Carboxylic acid groups can also promote adhesion, but the acid groups discussed above in connection with the acid-functional free-radically polymerizable comonomers may be otherwise engaged in rendering the oligomer water-soluble per se or by neutralization. The adhesion-promoting olefinically unsaturated comonomers accordingly may contain carboxylic acid groups but desirably also will contain one or more other groups having an affinity for the desired substrate.

Exemplary adhesion-promoting olefinically unsaturated comonomers include acetoacetoxy esters of hydroxyalkyl (e.g. $C_1$-$C_{12}$) (meth)acrylates such as acetoacetoxyethyl methacrylate ("AAEM", CAS No. 21282-97-3); unsaturated ketones such as acrolein (CAS No. 107-02-8), methacrolein (CAS No. 78-85-3) and vinyl methyl ketone ("MVK" or butenone, CAS No. 78-94-4); hydroxyl alkyl (meth)acrylates such as 2-hydroxymethyl (meth)acrylate, 2-hydroxyethyl (meth)acrylate, 2-hydroxypropyl (meth)acrylate, 3-chloro-2-hydroxypropyl (meth)acrylate, 2-hydroxy-butyl (meth)acrylate, 6-hydroxyhexyl (meth)acrylate, 5,6-dihydroxyhexyl methacrylate and cyclic trimethylolpropane formal acrylate (also known as 5-ethyl-1,3-dioxan-5-yl)methyl acrylate, CAS No. 66492-51-1); keto group-containing amides such as diacetone acrylamide ("DAAM", CAS No. 2873-97-4); tetrahydrofirfuryl acrylate (CAS No. 2399-48-6); ureido methacrylate (CAS No. 86261-90-7, sometimes supplied as a 25% solution in methyl methacrylate); vinyl silanes; and other monomers that based on this description will be familiar to persons having ordinary skill in the art. DAAM is a particularly preferred comonomer for compositions that will be used on bare wood, interior walls, aged alkyds and low surface energy plastics such as polyvinyl chloride ("PVC"). Vinyl silanes such as vinyltrimethoxysilane (CAS No. 2768-02-7) are particularly preferred for compositions that will be used on cementitious substrates such as concrete, cement board and fiber cement board. When the composition will be mixed with or used atop (viz., on top of) an oil-based coating such as an alkyd, the adhesion-promoting olefinically unsaturated comonomer may also or instead be an oleophilic long-chain alkyl-substituted free-radically polymerizable monomer, for example lauryl methacrylate. When the adhesion-promoting olefinically unsaturated comonomer is a keto-containing monomer such as AAEM or DAAM, the remainder of the disclosed coating composition preferably does not include a keto-reactive component such as ADH. ADH can promote crosslinking through and consumption of the keto groups and thereby lessen the extent to which the adhesion-promoting olefinically unsaturated comonomer could impart improved adhesion to a substrate. In another embodiment, an oligomer made using AAEM or DAAM may, following oligomerization and neutralization of the acid-functional groups in water (for example, using ammonia), be converted to a solubilized oligomer having primary amine adhesion-promoting groups. This conversion may for example be carried out by post-adding to the aqueous emulsion about one equivalent of a diamine (for example, hydrazine).

A variety of other (viz., non-acid-functional and non-adhesion-promoting) olefinically unsaturated comonomers may be copolymerized with the acid monomer(s) and the adhesion-promoting olefinically unsaturated comonomer(s). Exemplary such other monomers include acrylate and methacrylate esters (discussed in more detail below), styrenes (for example, styrene and a variety of substituted styrenes, such as α-methyl styrene and t-butyl styrene), nitriles (for example acrylonitrile and methacrylonitrile), dienes (for example, 1,3-butadiene and isoprene), vinyl esters (for example, vinyl alkanoates such as vinyl acetate, vinyl propionate, vinyl butyrate, vinyl isobutyrate, vinyl valerate and vinyl caproate) and free-radically polymerizable vinyl halides (for example, vinyl chloride, vinylidene chloride and vinyl fluoride). Exemplary acrylates include straight chain and branched alkyl esters of $C_1$ to $C_{12}$ alcohols and acrylic acid, such as methyl acrylate, ethyl acrylate, n-butyl acrylate, and 2-ethylhexyl acrylate, and cycloalkyl (usually $C_5$-$C_{12}$) acrylates such as isobornyl acrylate and cyclohexyl acrylate. Exemplary methacrylates include straight chain and branched alkyl esters of $C_1$ to $C_{12}$ alcohols and methacrylic acid, such as methyl methacrylate, ethyl methacrylate, and n-butyl methacrylate, and (usually $C_5$ to $C_{12}$) cycloalkyl methacrylates such as isobornyl methacrylate and cyclohexyl methacrylate. Preferred other monomers include methyl methacrylate, styrene, ethyl acrylate, n-butyl acrylate and n-butyl methacrylate.

The disclosed mixture of olefinically unsaturated monomers includes 1 to 45 wt. % acid-functional olefinically unsaturated comonomers, 0.5 to 20 wt. % adhesion-promoting olefinically unsaturated comonomers, and 98.5 to 50 wt. % other olefinically unsaturated comonomers. In some embodiments the disclosed mixture may include at least about 2 or at least about 5 wt. % and up to about 15 or up to about 10 wt. % acid-functional olefinically unsaturated comonomers. In additional embodiments the disclosed mixture may include at least about 1 and up to about 5 wt. % adhesion-promoting olefinically unsaturated comonomers. In further embodiments the disclosed mixture may include at least about 60 wt. %, at least about 70 wt. % or at least about 80 wt. % other olefinically unsaturated comonomers.

As discussed above, the oligomer has an Mn of 500 to 50,000. Oligomers having Mn values at the low end of this range tend to form transparent solutions. The oligomer Mn value should not be so high as to form insoluble particles rather than a water-soluble oligomer. in some embodiments, the oligomer Mn is about 2,500 to about 5,000.

As discussed above, the oligomer has a Tg of at least 70° C. Tg values may be calculated based upon the Fox Equation, or may be measured using techniques such as differential scanning calorimetry ("DSC"). The oligomer Tg may be selected in part based on the Tg for the hydrophobic polymer so as to obtain a hydrophobic polymer Tg at least 40° C. lower than the oligomer Tg. Oligomers having too low a Tg can induce blocking. In some embodiments, the oligomer has a Tg of 70 to 125° C., and in some embodiments, a Tg of at least 80° C. or a Tg of 80 to 125° C. In some embodiments, the oligomer is formed in an organic solvent-free aqueous emulsion, and in some embodiments, the oligomer is free of functional groups that would impart crosslinkability when the aqueous emulsion is applied and dried on a substrate.

The general procedures employed in the step a) aqueous oligomerization reaction will be familiar to persons having ordinary skill in the art, and may be carried out by dispersing the recited monomers in an aqueous medium and conducting oligomerization using a free-radical initiator (preferably a water-soluble initiator) with heating (e.g. at 5 to 95° C.) and stirring or other agitation as needed to obtain the desired oligomer reaction rate and yield. Higher temperatures may be employed by pressurizing the reaction vessel. Low or lower temperatures may be aided by the use of appropriate initiators or reducing agents (e.g., sodium dithionate). Normally one or more conventional emulsifying agents (viz., surfactants) will be employed in the oligomerization reaction, for example anionic or nonionic emulsifiers such as sodium, potassium or ammonium salts of dialkylsulfosuccinates, sulfated oils, alkyl sulphonic acids, alkyl sulfates such as sodium lauryl sulfate or fatty acids such as sodium stearate and sodium oleate; alkali metal salts of sulfonic acids, $C_{12-24}$ fatty alcohols, ethoxylated fatty acids or fatty amides; aryl-containing analogues of the above-mentioned alkyl-containing emulsifiers; and phosphates. Low emulsifier amounts preferably are employed, for example 0.3 to 2% by weight or 0.3 to 1% by weight emulsifier based on the weight of total monomers charged to the reaction vessel. The oligomerization reaction may employ one or more conventional free radical initiators. Exemplary initiators include peroxides such as hydrogen peroxide, t-butyl-hydroperoxide and cumene hydroperoxide; persulfates such as ammonium persulfate, potassium persulfate and sodium persulfate; and redox initiator systems such as a combination of t-butyl hydroperoxide, isoascorbic acid and ethylenediaminetetraacetic acid ferric-sodium salt (FeEDTA). The amount of initiator, or initiator system, may for example be about 0.05 to 3% based on the weight of total monomers charged. The oligomerization reaction may be carried out using an "all-in-one" batch addition procedure (viz., in which all the components to be employed are present at the start of oligomerization), a semi-batch procedure (viz., in which one or more of the components employed, usually at least one of the monomers, is wholly or partially fed to the reaction vessel during oligomerization), or a continuous procedure (viz., in which the components are continuously fed to the reaction vessel during oligomerization). The molecular weight of the oligomer desirably is controlled by using a suitable chain transfer agent such as a mercaptan (thiol), halohydrocarbon, or a-methyl styrene. If the oligomer formed in step a) is not water-soluble per se, then it preferably is neutralized before or at the start of the polymerization reaction in step b).

A variety of free-radically polymerizable monomers may be used in step b) to form the hydrophobic polymer. Exemplary such monomers include the other (viz., non-acid-functional and non-adhesion-promoting) olefinically unsaturated comonomers described above in connection with the oligomerization reaction, and other free-radically polymerizable monomers such as o-, m- and p-methylstyrene, o-, m- and p-ethylstyrene, p-chlorostyrene and p-bromostyrene; straight chain and branched acrylic and methacrylic esters of alkanols (usually $C_1$-$C_{12}$) such as t-butyl methacrylate and 2-ethylhexyl methacrylate; and dienes such as 1,3-butadiene and isoprene. The types and amounts of such other monomers desirably are selected so as to provide a hydrophobic polymer having a Tg at least 40° C. below that of the oligomer. Preferably sufficient free-radically polymerizable monomer(s) are employed so as to provide a hydrophobic polymer that represents at least about 50 wt. %, at least about 55 wt. %, or at least about 60 wt. %, and up to about 95 wt %, up to about 90 wt. % or up to about 80 wt. %, of the combined weight of oligomer plus hydrophobic polymer.

A variety of di- or higher-functional chain-extending monomers may be used to form the hydrophobic polymer. Exemplary such chain-extending monomers include di- or higher-functional acrylates or methacrylates such as 1,3-butanediol diacrylate, 1,4-butanediol diacrylate ("BDDA"), 1,6-hexanediol diacrylate ("HDDA", CAS No. 13048-33-4) and ethylene glycol dimethacrylate ("EGDMA", CAS No. 97-90-5); allyl acrylates and methacrylates such as allyl methacrylate ("AMA", CAS No. 96-05-09); vinyl silanes such as vinyl trimethoxy silane (CAS No. 2768-02-7); and acetoacetoxy esters of hydroxyalkyl (e.g. $C_1$-$C_{12}$) (meth) acrylates such as AAEM. Difunctional chain-extending monomers represent a preferred subclass of such monomers. The types and amounts of chain-extending monomers desirably are selected so as to provide a hydrophobic polymer having a Tg is at least 40° C. below that of the oligomer. In some embodiments the hydrophobic polymer is formed from at least about 0.1 wt. % or at least about 0.25 wt. % or at least about 0.5 wt. % chain-extending monomers. In additional embodiments the hydrophobic polymer is formed from up to about 3 wt. % or up to about 2 wt. % or up to about 1.5 wt. % chain-extending monomers.

The general procedures employed in the step b) emulsion polymerization reaction will be familiar to persons having ordinary skill in the art, and may be carried out by dispersing the recited monomers in an aqueous medium containing the oligomer and one or more suitable free-radical initiators. The reactants may be combined using a variety of reaction schemes, with the following being exemplary. In one embodiment an aqueous solution of the oligomer is admixed with all of the monomers to be used in the formation of the hydrophobic polymer and an otherwise conventional "all-in-one" batch polymerization, with no further addition of monomers, is carried out to make the polymer. In another embodiment, the polymerization is basically still a batch process, with all of the oligomer solution being present in the polymerization vessel prior to the start of polymerization along with some of the monomer system for the hydrophobic polymer, and with the remainder of the monomer system being added quickly in one addition at an appropriate time after the polymerization has commenced. In a further embodiment, the polymerization is still basically a batch process, with all of the oligomer solution being present in the polymerization vessel prior to the start of the polymerization, but with the monomer system for the hydrophobic polymer being split into several equal parts. These parts are added and polymerized consecutively to one another in order to obtain more control over the polymerization, and in effect provide a polybatch process.

In other embodiments, semi-batch processes are employed in which part (or none) of the monomer system for the hydrophobic polymer is present prior to the start of polymerization in the polymerization reaction vessel and part (or the entire amount) is fed to polymerization vessel during the course of polymerization. In one such embodiment, the aqueous oligomer solution is present (in part) in the reaction medium for the polymerization while part of the aqueous oligomer solution, acting as an emulsifier, is mixed with the entire monomer system for the hydrophobic polymer and then fed to the polymerization vessel during polymerization. In another embodiment, the entire oligomer solution is present in the reaction vessel prior to the start of polymerization and the entire monomer system for the hydrophobic polymer is fed to the vessel during polymerization, viz., no oligomer is present in the monomer feed. In a further embodiment, all of the aqueous oligomer solution is present in the reaction vessel prior to the start of the polymerization together with part of the monomer system for the hydrophobic polymer, and the remainder of the monomer system is fed during polymerization (viz., without oligomer in the feed). In a still further embodiment, part of the oligomer solution is present in the reaction vessel prior to start of the polymerization together with part of the monomer system for the hydrophobic polymer, and the remainder of the monomer system admixed with the remainder of the oligomer solution is fed during polymerization.

In the various reaction schemes described above, a separate emulsifier preferably is largely or entirely omitted, and the water-soluble oligomer is instead wholly or partially relied upon to emulsify the polymer formed in step b). Without intending to be bound by theory, the oligomer may stabilize the hydrophobic polymer as the polymer forms, with the hydrophobic polymer polymerization reaction forming insoluble, rubbery, hydrophobic polymer particles surrounded by the oligomer which serves as a surfactant to disperse or help disperse the hydrophobic polymer particles in the aqueous emulsion. Thus the aqueous emulsion resulting from step b) preferably contains a very low level of added emulsifier (not counting the oligomer itself), for example less than 0.5%, less than 0.25%, or no such added emulsifier based on the total weight of monomers charged, and with the only emulsifier present (not counting the oligomer itself) preferably being that remaining from the step a) oligomerization reaction.

In a preferred embodiment, the disclosed hydrophobic polymer preferably comprises a rubbery, high molecular weight material that has been chain-extended during step b), has been made without an added crosslinker (for example, without an added hydrolyzable crosslinker), and provides a high molecular binder polymer that is coalescable rather than self-crosslinking. The polymer may for example have an MFFT of about 0 to about 55° C. (e.g., about 0 to about 30° C.), and a Koenig hardness of at least about 40 sec. (e.g., about 60 to about 200 sec.). The polymer may for example have an elongation of about 100 to about 240%, a non-tacky surface, and a blocking resistance of 4 or 5 in the Blocking Resistance test shown below. The flexibility, elongation and blocking resistance of the polymeric product may be influenced in part by the respective Tg values of the oligomer and the hydrophobic polymer, and by the difference between such Tg values. For example, if the oligomer Tg is below about 80° C., then the block resistance of the hydrophobic polymer may be adversely affected. If the hydrophobic polymer Tg is greater than about −20° C., the polymer may have reduced flexibility. In some embodiments, the hydrophobic polymer Tg is less than about −40° C. or less than about −60° C.

The performance characteristics of the product polymer may also be affected by the relative oligomer and hydrophobic polymer amounts and by the chain-extending monomer amount. For example, water resistance may increase as the hydrophobic polymer amount polymer amount is increased relative to the oligomer amount. In certain embodiments, the oligomer represents about 1 to about 70 wt. % or about 5 to about 50 wt. % of the total oligomer and hydrophobic polymer solids. Also, as the amount of chain-extending monomer is increased above about 1.5 wt. %, film flexibility may decline. Through appropriate adjustment of the factors discussed above, product polymers having a desirable balance of factors including block resistance, water resistance and elasticity may be obtained.

The above-mentioned NEOCRYL XK-98 self-crosslinking acrylic emulsion polymer is believed to be made by adding ADH crosslinker at the end of polymerization, in what the above-mentioned European Patent No. EP 0 758 364 B2 refers to as step c). The presently disclosed hydrophobic polymer preferably is made without such step c), viz., without adding a crosslinker at the end of polymerization. Omitting the crosslinker also eliminates the undesirable discharge of crosslinker into drains, water treatment systems and bodies of water when used brushes, rollers or containers are washed to remove excess coating composition. Omitting the crosslinker can also provide benefits after the coating composition had been applied and cured. For example, ADH is a relatively easily hydrolyzed Schiff base whose hydrolysis reaction can be catalyzed by acids and bases, including acid rain and concrete or other alkali substrates. The hydrolysis reaction can liberate ADH from the crosslinked coating. Consequently ADH and other hydrolyzable crosslinkers preferably are not used in the disclosed coating compositions. Exemplary other such hydrolyzable crosslinkers include other polyhydrazides (e.g., oxalic acid dihydrazide, succinic dihydrazide, suberic dihydrazide and phthalic acid dihydrazide), polyisocyanates, melamine, glycoluril, polyamines such as isophorone diamine and 4,7-dioxadecane-1,10-diamine, and diacids such as terephthalic acid. Crosslinkers that may release volatile diacrylates whose smell may be objectionable are also desirably avoided. The disclosed coating compositions accordingly preferably are free of or substantially free of added crosslinker and especially added hydrolyzable or odor-producing crosslinker. In one exemplary embodiment, the disclosed coating composition contains less than 0.01% free hydrolyzable or odor-producing crosslinker, for example less than 0.01% free ADH.

In comparison to the above-mentioned NEOCRYL XK-98 polymer, the presently-disclosed polymers preferably also have increased oligomer molecular weight, employ lower Tg monomers to make the polymer, and make a more rubbery polymer.

If desired, one or more functional monomer(s) for imparting crosslinkability may optionally be added to the disclosed coating compositions. Such added functional monomers typically will not be acid-functional monomers. Exemplary such added monomers include hydroxyl- or epoxy-functional (meth)acrylates such as hydroxyalkyl (usually $C_1$-$C_{12}$) methacrylates, for example 2-hydroxyethyl methacrylate, glycidyl methacrylate, and their corresponding acrylates; keto- and aldehyde-functional monomers such as acrolein, methacrolein, and methyl vinyl ketone; acetoacetoxy esters of hydroxyalkyl (usually $C_1$-$C_{12}$) acrylates and methacrylates such as acetoacetoxyethyl acrylate or methacrylate; and keto- or aldehyde-containing amides such as diacetone acrylamide. Minor amounts (e.g., less than 5 wt. % and preferably less than 2 wt. %) of one more acid-functional monomers (e.g. acrylic or methacrylic acid) may also be used to form the hydrophobic polymer, so long as their inclusion does not unduly adversely affect the hydrophobic character of the resulting polymer. In a preferred embodiment of the hydrophobic polymer, acid-functional monomers are not (apart from those used to make the oligomer) used in its formation. In one embodiment, the hydrophobic polymer is made using at least one of a $C_{1-10}$ alkyl methacrylate such as n-butyl methacrylate), a $C_{3-10}$ alkyl acrylate such as n-butyl acrylate, and usually, diacetone acrylamide and/or acetoacetoxyethyl methacrylate.

The disclosed coating compositions preferably have good in-can stability, low leachable material content (for example, low leachable oligomer content), low chalking and low blushing. The disclosed coating compositions may be solvent-free or may contain a small amount (e.g., up to about 5 wt. % of a low-VOC solvent, e.g., a coalescing solvent). The cured or hardened coating may be transparent, translucent or pigmented. Representative pigments will be familiar to persons having ordinary skill in the art, and are described for example in U.S. Pat. No. 8,141,599 B2 (Korenkiewicz et al.) and U.S. Pat. No. 9,284,467 B2 (Booth et al.). The disclosed coating compositions may include a variety of other adjuvants including anti-cratering agents, biocides, colorants, crosslinkers, curing indicators, defoamers, dyes, fillers, flatting agents, flow control agents, fungicides, heat stabilizers, leveling agents, mar and abrasion additives, plasticizers, rheology control agents, sedimentation inhibitors, surface active agents, thickeners, ultraviolet-light absorbers, waxes and the like. The solids content of to final coating composition may for example be at least about 20 or at least about 30 wt. % on a total weight basis, and up to about 65 or up to about 55 wt. %. The solids content may, if desired, be adjusted by adding water or by removing water (e.g. by distillation or ultrafiltration).

The disclosed coating compositions may be used in a variety of products including interior & exterior paints (e.g., gloss, semigloss, satin, eggshell or flat paints), glazes, Lazure finishes and stains (e.g., transparent, semitransparent or opaque penetrating or non-penetrating stains). The disclosed coating compositions may be applied to a variety of substrates including coils and other forms of sheet metal, cans, fabrics, vinyl and other plastics, paper, plaster, gypsum wallboard, cement fiberboard, concrete, metal panels, wire, metal parts, wood, wood veneer and the like. The chosen substrate may for example include walls, ceilings, floors, trim, siding, decks, roofing, furniture and the like. The coating compositions may be applied to substrates using any suitable application method. For example, the compositions may be roll coated, sprayed, curtain coated, vacuum coated, brushed, or flood coated using an air knife system. Preferred application methods provide a uniform coating thickness and are cost efficient. Especially preferred application methods employ factory equipment that moves the substrate past a coating head and thence past suitable drying or curing equipment. The compositions once applied may be allowed to dry naturally at ambient temperature, or the drying process may be accelerated by heat.

Exemplary coating end uses include farm implement coatings, construction equipment coatings, auto-, truck- or airplane exterior finishes, appliance coatings, furniture coatings, overprint varnishes, inks, adhesives, floor finishes and the like. A recommended thickness for the dried or otherwise hardened coating composition is between about 10 and about 200 micrometers, preferably between about 25 and about 120 micrometers, more preferably between about 30 and about 100 micrometers, and most preferably between about 35 and about 75 micrometers.

The disclosed compositions may be evaluated using a variety of tests including those discussed below.

ISO 2812-4:2007—Determination of Resistance to Liquids

The coating composition is applied as a 100 micrometer thick wet film over a plastic-coated black Leneta chart (Leneta Company) and dried for 7 days at ambient temperature and humidity. A water spot is applied and left atop the coating for 24 hours. After removal of the water, the extent of coating damage is assessed using a 5 point rating scale, with a "5" rating corresponding to an untouched coating, a "0" rating corresponding to a completely destroyed coating and ratings of "1" through "4" representing increasing levels of improvement.

ISO 1522:2006—Pendulum Damping Test (Koenig Hardness)

The coating composition is applied as a 90 μm thick wet film coating over glass panels and allowed to dry for seven days at ambient temperature and humidity. The test pendulum is released and the number of seconds required for the pendulum to come to rest is recorded.

ASTM D2370—Standard Test Method for Tensile Properties of Organic Coatings

A 3 g solvent-free portion of the polymer dispersion is applied to a 10 cm diameter polyethylene lid and allowed to dry for seven days at ambient temperature and humidity. A tensile tester is used to evaluate the dried film sample and the percent elongation to break is recorded.

Hot Block Resistance (Modified Version of ASTM D4946)

The coating composition is applied to pine substrates as a 6 cm×2 cm stripe in three successive coats. A 10 mg/m² coating weight is used for each coat, with a 4 hour room temperature (viz., 23° C.) drying time after the first and second coats, and a 16 hour room temperature drying time after the third coat. The coated faces of two coated pine substrates are pressed together face-to-face relationship, with their stripes in opposition to one another, using a pressure of 1 kg/cm² for 4 hours at room temperature. The coated substrates are pulled apart and the damage is judged visually and audibly. The extent of visual coating damage is assessed using a 5 point rating scale, with a "5" rating corresponding to an untouched coating, a "0" rating corresponding to a completely destroyed coating and ratings of "1" through "4" representing increasing levels of improvement.

The invention is further described in the following Examples, in which all parts and percentages are by weight unless otherwise indicated.

Abbreviations

| Free-Radically Polymerizable (FRP) and Acid-Functional FRP Monomers | |
|---|---|
| MAA | Methacrylic acid |
| MMA | Methyl methacrylate |
| EA | Ethyl acrylate |
| BA | Butyl acrylate |
| BMA | Butyl methacrylate |

| Adhesion-Promoting Comonomers | |
|---|---|
| VTMeOSi | Vinyltrimethoxysilane |
| UMA | Ureido methacrylate |
| DAAM | Diacetone acrylamide |
| THFA | Tetrahydrofurfuryl acrylate |
| CTFA | Cyclic trimethylolpropane formal acrylate |
| HEMA | Hydroxyethyl methacrylate |

| Mercaptan Chain Transfer Agents | |
|---|---|
| nDM | n-Dodecyl mercaptan |
| 3-MPA | 3-Mecaptopropionic acid |
| iOTG | Isooctylthioglycolate |

| Intramolecular Crosslinkers | |
|---|---|
| BDDA | Butandiol diacrylate |
| HDDA | Hexandiol diacrylate |
| AMA | Allyl methacrylate |

| Other Ingredients | |
|---|---|
| APS | Ammonium persulfate |
| NH₃ | Ammonia |
| AA | Isoascorbic acid |
| SDS | Sodium dodecyl sulfate |
| tBHP | tert-Butyl hydroperoxide |
| FeEDTA | ethylenediaminetetraacetic acid ferric-sodium salt |

EXAMPLE 1

Oligomer 1 Preparation

A high Tg oligomer made from UMA/MAA/MMA in a 6/8/86 ratio was prepared by combining the ingredients shown below in Table 1. 100 Parts water and 0.5 parts of a 25% SDS solution were added to a reaction vessel and heated to 80° C. A pre-emulsion was made from ingredients 3-9 and a premix was made from ingredients 10-11. A 5% portion of the pre-emulsion was added to the reaction vessel, followed by 30% of the premix. The reaction vessel was permitted to drift to 85° C. A parallel feed of the remaining pre-emulsion and premix into the reaction vessel was initiated, with the pre-emulsion being added over a 60 minute time span and the premix being added over a 70 minute time span. Following addition of the premix, the reaction vessel was maintained at 85° C. for 30 minutes. A further premix made from ingredients 12-13 was added to the reaction vessel to neutralize the oligomer solution to pH 8.25. The reaction mixture was stirred for 30 minutes at 85° C. and allowed to cool to room temperature. The resulting oligomer solution contained 27.5% solids and had a viscosity less than 250 mPa-s. The oligomer had an Mn value of 2,957, a weight average molecular weight (Mw) of 11,061 and a Tg of 110° C.

TABLE 1

| Ingredient | Description | Parts |
|---|---|---|
| 1 | Water | 100 |
| 2 | SDS (25%) | 0.5 |
| 3 | Water | 74 |
| 4 | SDS (25%) | 1.5 |
| 5 | MMA | 86 |
| 6 | UMA (25%) | 24 |
| 7 | MAA | 8 |
| 8 | nDM | 0.16 |
| 9 | 3-MPA | 0.08 |
| 10 | APS | 0.3 |
| 11 | Water | 20 |
| 12 | NH$_3$ (25%) | 8 |
| 13 | Water | 50 |
| | Total | 373 |

EXAMPLE 2

Oligomer 2 Preparation

Using the method of Example 1, a lower Tg oligomer was made using UMA/MAA/MMA/EA in a 6/6/76/12 ratio, and using 0.32 parts nDM and 0.16 parts 3-MPA. The resulting oligomer solution contained 27.5% solids and had a viscosity less than 250 mPa-s. The oligomer had an Mn value of 2,427, an Mw of 5,847 and a Tg of 76° C.

EXAMPLE 3

Oligomer 3 Preparation

Using the method of Example 1, a high Tg oligomer was made using MAA/MMA in a 6/94 ratio, and without using an adhesion-promoting comonomer. The resulting oligomer solution contained 27.5% solids and had a viscosity less than 250 mPa-s. The oligomer had an Mn value of 4,100, an Mw of 13,352 and a Tg of 110° C.

EXAMPLE 4

Oligomer 4 Preparation

Using the method of Example 1, a high Tg oligomer was made using DAAM/MAA/MMA in a 6/8/86 ratio. The resulting oligomer solution contained 27.5% solids and had a viscosity less than 250 mPa-s. The oligomer had an Mn value of 2,988, an Mw of 11,184 and a Tg of 110° C.

EXAMPLE 5

Oligomer 5 Preparation

Using the method of Example 1, a high Tg oligomer was made using VTMeOSi/MAA/MMA in a 6/8/86 ratio, and using 1 part SDS solution. The resulting oligomer solution contained 27.5% solids and had a viscosity less than 250 mPa-s. The oligomer had an Mn value of 3,742, an Mw of 11,763 and a Tg of 110° C.

EXAMPLE 6

Hydrophobic Polymer 1 Preparation

A hydrophobic polymer was prepared using a hard, high Tg oligomer (Oligomer 1) and a soft polymer made by polymerizing BA/BMA/MMA/UMA/BDDA in a 70/12/16/1/1 ratio in the presence of Oligomer 1 using the ingredients shown below in Table 2. 100 Parts water and 141.8 parts of Oligomer 1 were added to a reaction vessel and heated to 35° C. A monomer premix was made from ingredients 3-7, and half of it was added to the reaction vessel and mixed for 30 minutes. A first initiator premix was made from ingredients 8 and 9 and added to the reaction vessel. A second initiator premix was made from ingredients 10 and 11, and ½ of it was added to the reaction vessel as a shot. A third initiator premix was made from ingredients 12 and 13, and ⅙ of it was added to the reaction vessel as a shot. The reaction mixture temperature was allowed to rise to 55° C. After 10 minutes, another ⅓ of the third initiator premix was fed to the reaction vessel over a 30 minute period. The reaction mixture was allowed to cool to 40° C. The remaining half of the monomer premix was added to the reaction vessel, followed by mixing and addition of the remaining second and third premix solutions as described above. The reaction mixture was allowed to cool to room temperature. The performance characteristics of the resulting aqueous emulsion are shown below in Table 3:

TABLE 2

| Ingredients | Description | Parts |
|---|---|---|
| 1 | Water | 100 |
| 2 | Oligomer 1 | 141.8 |
| 3 | BA | 70 |
| 4 | BMA | 12 |
| 5 | MMA | 16 |
| 6 | UMA (25%) | 4 |
| 7 | BDDA | 1 |
| 8 | FeEDTA | 0.005 |
| 9 | Water | 5 |
| 10 | tBHP | 0.3 |
| 11 | Water | 1.5 |
| 12 | Ascorbic acid | 0.3 |
| 13 | Water | 55 |
| | Total | 407 |

TABLE 3

| Performance Characteristics | |
|---|---|
| Solids Content, % | 35 |
| Free BA, ppm | <50 |
| pH | 8.5 |
| Viscosity at 25° C., mPa-s | <100 |
| MFFT, ° C. | 0 |
| Oligomer:Polymer Ratio | 30/70 |
| Polymer Tg, ° C. (via Fox Equation) | −30 |
| ISO 2812-4: 2007 Resistance to liquids | 5 |
| ISO 1522: 2006 Koenig Hardness, sec | 65 |
| Block Resistance | 5 |
| Elongation, % | 205 |

EXAMPLE 7

Hydrophobic Polymer 2 Preparation

Using the method of Example 6, a hydrophobic polymer was prepared using a soft, lower Tg oligomer (Oligomer 2) and a soft polymer made from BA/BMA/MMA/UMA/BDDA polymerized in a 62/23/13/1/1 ratio in the presence of Oligomer 2. The performance characteristics of the resulting aqueous emulsion are shown below in Table 4:

TABLE 4

| Performance Characteristics | |
|---|---|
| Solids Content, % | 35 |
| pH | 8.5 |
| Viscosity at 25° C., mPa-s | <100 |
| MFFT, ° C. | 5 |
| Oligomer:Polymer Ratio | 30:70 |
| Polymer Tg, ° C. (via Fox Equation) | −20 |
| ISO 2812-4: 2007 Resistance to liquids | 5 |
| ISO 1522: 2006 Koenig Hardness, sec | 47 |
| Block Resistance | 4.5 |
| Elongation, % | 148 |

EXAMPLE 8

Hydrophobic Polymer 3 Preparation

Using the method of Example 6, a hydrophobic polymer was prepared using a hard oligomer (Oligomer 3) and a soft polymer made from BA/BMA/MMA polymerized in a 71/13/16 ratio in the presence of Oligomer 3. The performance characteristics of the resulting aqueous emulsion are shown below in Table 5:

TABLE 5

| Performance Characteristics | |
|---|---|
| Solids Content, % | 35 |
| pH | 8.5 |
| Viscosity at 25° C., mPa-s | <100 |
| MFFT, ° C. | −5 |
| Oligomer:Polymer Ratio | 30:70 |
| Polymer Tg, ° C. (via Fox Equation) | −30 |
| ISO 2812-4: 2007 Resistance to liquids | 3 |
| ISO 1522: 2006 Koenig Hardness, sec | 62 |
| Block Resistance | 3.5 |
| Elongation, % | 241 |

EXAMPLE 9

Hydrophobic Polymer 4 Preparation

Using the method of Example 6, a hydrophobic polymer was prepared using a hard, high Tg oligomer (Oligomer 4) and a soft polymer made using diacetone acrylamide as the adhesion-promoting olefinically unsaturated comonomer with BA/BMA/MMA/DAAM in a 71/12/16/1 ratio in the presence of Oligomer 4. The performance characteristics of the resulting aqueous emulsion are shown below in Table 6:

TABLE 6

| Performance Characteristics | |
|---|---|
| Solids Content, % | 35 |
| pH | 8.5 |
| Viscosity at 25° C., mPa-s | <100 |
| MFFT, ° C. | 2 |
| Oligomer:Polymer Ratio | 30:70 |
| Polymer Tg, ° C. (via Fox Equation) | −30 |
| ISO 2812-4: 2007 Resistance to liquids | 4 |
| ISO 1522: 2006 Koenig Hardness, sec | 59 |
| Block Resistance | 3.5 |
| Elongation, % | 251 |

EXAMPLE 10

Hydrophobic Polymer 5 Preparation

Using the method of Example 6, a hydrophobic polymer was prepared using a hard oligomer (Oligomer 5) and a soft polymer made from BA/BMA/MMA/UMA/BDDA polymerized in a 70/12/13/1/1 ratio in the presence of Oligomer 5. The performance characteristics of the resulting aqueous emulsion are shown below in Table 7:

TABLE 7

| Performance Characteristics | |
|---|---|
| Solids Content, % | 35 |
| pH | 8.5 |
| Viscosity at 25° C., mPa-s | <100 |
| MFFT, ° C. | 4 |
| Oligomer:Polymer Ratio | 30:70 |
| Polymer Tg, ° C. (via Fox Equation) | −30 |
| ISO 2812-4: 2007 Resistance to liquids | 5 |
| ISO 1522: 2006 Koenig Hardness, sec | 65 |
| Block Resistance | 5 |
| Elongation, % | 196 |

EXAMPLE 11

Hydrophobic Polymer 6 Preparation

Using the method of Example 6, a hydrophobic polymer was prepared using a hard, high Tg oligomer (Oligomer 4), and a soft polymer made using diacetone acrylamide as the adhesion-promoting olefinically unsaturated comonomer, 1,6-hexanediol diacrylate as the chain-extending monomer and BA/BMA/MMA/DAAM/HDDA polymerized in a 70/12/16/1/1 ratio in the presence of Oligomer 4. The performance characteristics of the resulting aqueous emulsion are shown below in Table 8:

TABLE 8

| Performance Characteristics | |
|---|---|
| Solids Content, % | 35 |
| pH | 8.5 |
| Viscosity at 25° C., mPa-s | <100 |
| MFFT, ° C. | 0 |
| Oligomer:Polymer Ratio | 30:70 |
| Polymer Tg, ° C. (via Fox Equation) | −30 |
| ISO 2812-4: 2007 Resistance to liquids | 5 |
| ISO 1522: 2006 Koenig Hardness, sec | 62 |
| Block Resistance | 4.5 |
| Elongation, % | 214 |

COMPARISON EXAMPLE

ADH-Containing Polymers

The performance characteristics of two commercially available aqueous emulsions containing ADH (viz., NEOCRYL XK-98 self-crosslinking acrylic emulsion polymer and NEOCRYL XK-232 self-crosslinking anionic acrylic copolymer emulsion) were evaluated. The results are set out below in Table 9, along with results for Hydrophobic Polymer 3 and Hydrophobic Polymer 4. The presence of ADH in the commercially available emulsions, and the absence of ADH in the Hydrophobic Polymer 3 and Hydrophobic Polymer 4 emulsions, was confirmed by Liquid Chromatography-Mass Spectrometry (LC-MS).

TABLE 9

| Performance Characteristics | (Co)Polymer | | | |
|---|---|---|---|---|
| | NEOCRYL XK-98 | NEOCRYL XK-232 | Hydrophobic Polymer 3 | Hydrophobic Polymer 4 |
| Solids Content, % | 35 | 35 | 35 | 35 |
| pH | 8.5 | 8.5 | 8.5 | 8.5 |
| Viscosity at 25° C., mPa-s | <100 | <100 | <100 | <100 |
| MFFT, ° C. | +5 | 0 | −5 | +2 |
| ISO 2812-4: 2007 Resistance to liquids | 5 | 5 | 3 | 4 |
| ISO 1522: 2006 Koenig Hardness, sec | 70 | 50 | 62 | 59 |
| Block Resistance | 5 | 3.5 | 3.5 | 3.5 |
| Elongation, % | 176 | 252 | 241 | 251 |

The results in Table 9 show that NEOCRYL XK-98 polymer had somewhat greater block resistance and water resistance than Hydrophobic Polymer 3 and Hydrophobic Polymer 4, but was more brittle. NEOCRYL XK-232 copolymer had comparable block resistance and somewhat greater water resistance than Hydrophobic Polymer 3 and Hydrophobic Polymer 4, lower block resistance than XK-98 polymer, and more elastic character (as evaluated by measuring the percentage of free film elongation) than Hydrophobic Polymer 3, Hydrophobic Polymer 4 and XK-98 polymer. The results in Table 9 and the LC-MS results mentioned above show that coating formulations based on Hydrophobic Polymer 3 or Hydrophobic Polymer 4 should perform comparably to formulations based on NEOCRYL XK-98 and NEOCRYL XK-232, while avoiding the use of ADH and accompanying concerns regarding toxicity to aquatic life as discussed in Commission Decision (EU) 2016/397 of 16 Mar. 2016.

EXAMPLE 12

Clearcoat

A clearcoat formulation was prepared using the ingredients shown below in Table 10:

TABLE 10

| Clearcoat Formulation | |
|---|---|
| Ingredient | Wt. % |
| Example 6 Hydrophobic Polymer | 54.0 |
| Water | 42.6 |
| Ammonia | 0.2 |
| TEGO FOAMEX ™ 822 defoamer (Evonik Inds.) | 0.2 |
| TEGO AIREX ™ 902W deaerator (Evonik Inds.) | 0.2 |
| SILTECH ™ C-204 wetting agent (Siltech Corp.) | 0.2 |
| TINUVIN ™ 292 light stabilizer (BASF) | 0.5 |
| TINUVIN 1130 light stabilizer (BASF) | 1.0 |
| MERGAL ™ 721 K3 preservative (Troy Corp.) | 0.1 |
| Acrysol RM 2020 rheology modifier (Dow Chemical) | 0.6 |
| Acrysol RM 8W rheology modifier (Dow Chemical) | 0.4 |
| Total | 100.0 |

Figure 1:
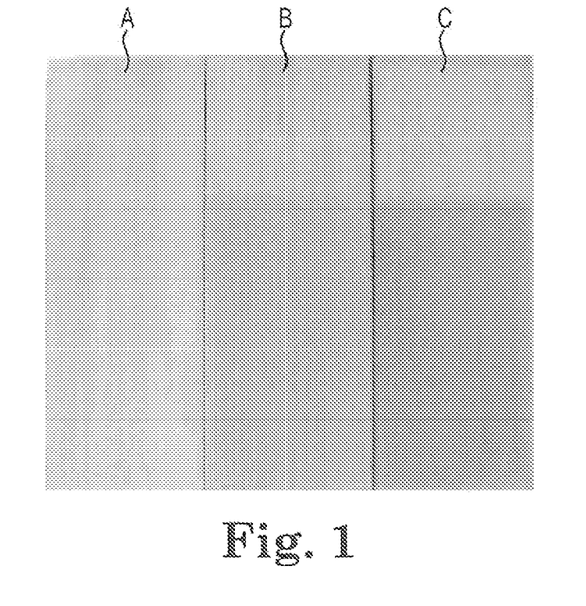
FIG. 1 shows clearcoated wood panels evaluated in a simulated outdoor weathering tester.

The formulation was coated onto wood panels and allowed to dry. Several coated panels were exposed to simulated outdoor weathering using a QUV Accelerated Weathering Tester from Q-Lab Corporation and Method EN 927-6. Panel A in FIG. 1 is an unexposed panel. The lightened portions on the upper one-third of Panels B and C represent unexposed portions where the panels were clamped in the QUV Tester. The exposed lower portions Panel B and Panel C exhibited only mild discoloration after 1,000 hours (Panel B) and 2,000 hours (Panel C) total exposure. The very favorable simulated outdoor weathering results demonstrated that a clearcoat made using the disclosed polymer should exhibit very good service life in outdoor use.

EXAMPLE 12

Wood Stain

A pigmented reddish-brown wood stain formulation was prepared by adding 1.5 wt. % of a mixture of transparent red iron oxide, transparent yellow iron oxide and lamp black to the Table 10 formulation. The stain was coated onto the edges and sides of wood boards and allowed to dry. In a comparison run, wood boards were coated with a similar formulation made using NEOCRYL XK-98 rather than the Example 6 Hydrophobic Polymer in the Table 10 formulation.

Figure 2:
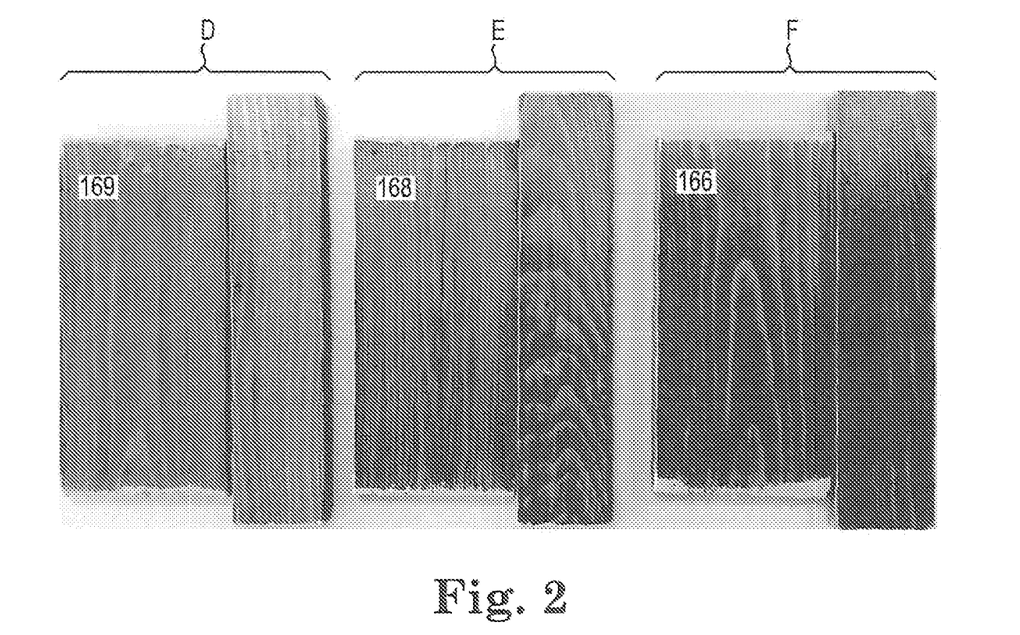
FIG. 2 shows stained wood panels stored outdoors for more than two winters.

The coated boards were exposed outdoors for 26 months, including more than two full winters. Boards D in FIG. 2 are unexposed. Boards E and F are exposed boards, respectively coated with the comparison run formulation and the Table 10 formulation. The Table 10 formulation exhibited better gloss retention and lower discoloration than the comparison run formulation. These results demonstrated that a stain made using the disclosed polymer exhibited very good service life in outdoor use, and that the disclosed polymer should provide an effective ADH-free replacement for stain formulations containing NEOCRYL XK-98.

Having thus described the preferred embodiments of the present invention, those of skill in the art will readily appreciate that the teachings found herein may be applied to yet other embodiments within the scope of the accompanying claims. The complete disclosure of all patents, patent documents, and publications are incorporated herein by reference as if individually incorporated.

The invention claimed is:

1. A method for making an aqueous emulsion, which method comprises:
   a) oligomerizing a mixture of free-radically polymerizable monomers in aqueous solution, the mixture including 1 to 45 wt. % acid-functional free-radically polymerizable comonomer(s), 0.5 to 20 wt. % adhesion-promoting free-radically polymerizable comonomer(s), and 98.5 to 50 wt. % other free-radically polymerizable comonomer(s), to form a water-soluble oligomer having a number average molecular weight (Mn) of 500 to 50,000 and a glass transition temperature (Tg) of at least 70° C., the acid-functional comonomer(s) rendering the oligomer water-soluble per se or by neutralization and the adhesion-promoting comonomer(s) imparting improved adhesion to a wood, plastic, metal or cementitious substrate when a coating composition containing the aqueous emulsion is applied and dried on such substrate, and
   b) emulsion polymerizing, in the presence of an aqueous solution of the oligomer, at least one free-radically polymerizable monomer and 0.1 to 20 wt. %, based on the weight of free-radically polymerizable monomer(s), of at least one di- or higher-functional chain-extending monomer(s), to form an aqueous emulsion of a hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide and other hydrolyzable crosslinkers and has a minimum film forming temperature≤55° C. and on drying has a Koenig hardness of at least 40 sec.

2. A coating composition comprising an aqueous emulsion of a hydrophobic polymer made from at least one free-radically polymerizable monomer and 0.1 to 20 wt. %, based on the weight of free-radically polymerizable monomer(s), of at least one di- or higher-functional chain-extending monomer(s), the hydrophobic polymer having been emulsion polymerized in the presence of an aqueous solution of an oligomer made from a mixture of free-radically polymerizable monomers in aqueous solution, the mixture including 1 to 45 wt. % acid-functional free-radically polymerizable comonomer(s), 0.5 to 20 wt. % adhesion-promoting free-radically polymerizable comonomer(s), and 98.5 to 50 wt. % other free-radically polymerizable comonomer(s), the acid-functional comonomer(s) rendering the oligomer water-soluble per se or by neutralization and the adhesion-promoting comonomer(s) imparting improved adhesion to a wood, plastic, metal or cementitious substrate when the coating composition is applied and dried on such a substrate, the oligomer having an Mn of 500 to 50,000 and a Tg of at least 70° C., and the hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide and other hydrolyzable crosslinkers, has a minimum film forming temperature≤55° C. and on drying has a Koenig hardness of at least 40 sec.

3. The coating composition according to claim 2, wherein the acid-functional free-radically polymerizable comonomer(s) comprise carboxyl groups.

4. The coating composition according to claim 2, wherein the adhesion-promoting free-radically polymerizable comonomer(s) comprise an aldehyde, ketone, ester, hydroxyl, silane or ureido group.

5. The coating composition according to claim 2, wherein the adhesion-promoting free-radically polymerizable comonomer(s) comprise acetoacetoxyethyl methacrylate, diacetone acrylamide or mixture thereof.

6. The coating composition according to claim 2, wherein the adhesion-promoting free-radically polymerizable comonomer(s) comprise a vinyl silane.

7. The coating composition according to claim 2, wherein the oligomer is made from up to about 15 wt. % acid-functional free-radically polymerizable comonomer(s), up to about 5 wt. % adhesion-promoting free-radically polymerizable comonomer(s), and at least about 80 wt. % other free-radically polymerizable comonomer(s).

8. The coating composition according to claim 2, wherein the oligomer has an Mn of about 2,500 to about 5,000, a Tg of 80 to 125° C. and is free of functional groups that would impart crosslinkability when the aqueous emulsion is applied and dried on a substrate.

9. The coating composition according to claim 2, wherein the chain-extending monomer(s) comprise a di- or higher-functional acrylate or methacrylate; allyl acrylate or methacrylate; vinyl silane or acetoacetoxy ester of a hydroxyalkyl (meth)acrylate.

10. The coating composition according to claim 2, wherein the chain-extending monomer(s) are difunctional monomers.

11. The coating composition according to claim 2, wherein the hydrophobic polymer is formed from about 0.1 to about 3 wt. % chain-extending monomers and represents at least about 50 wt. % and up to about 95 wt. % of the combined weight of oligomer plus hydrophobic polymer.

12. The coating composition according to claim 2, wherein the hydrophobic polymer has a Tg less than about −40° C.

13. The coating composition according to claim 2, wherein the aqueous emulsion has a minimum film forming temperature of about 0 to about 55° C. and a Koenig hardness of about 60 to about 200 seconds.

14. The coating composition according to claim 2, wherein the aqueous emulsion contains about 20 up to about 65 wt. % solids and two facing substrates coated with the dried aqueous emulsion and stored under a pressure of 1 kg/cm² for 1 hour at 23° C. do not exhibit blocking.

15. The coating composition according to claim 2, wherein the coating composition is a glaze or a Lazure finish.

16. A coated article comprising a substrate having thereon a layer of a coating composition comprising an aqueous emulsion of a hydrophobic polymer made from at least one free-radically polymerizable monomer and 0.1 to 20 wt. %, based on the weight of free-radically polymerizable monomer(s), of at least one di- or higher-functional chain-extending monomer(s), the hydrophobic polymer having been emulsion polymerized in the presence of an aqueous solution of an oligomer made from a mixture of free-radically polymerizable monomers in aqueous solution, the mixture including 1 to 45 wt. % acid-functional free-radically polymerizable comonomer(s), 0.5 to 20 wt. % adhesion-promoting free-radically polymerizable comonomer(s), and 98.5 to 50 wt. % other free-radically polymerizable comonomer(s), the acid-functional comonomer(s) rendering the oligomer water-soluble per se or by neutralization and the adhesion-promoting comonomer(s) imparting improved adhesion to the substrate when the coating composition is dried, the oligomer having a number average molecular weight Mn of 500 to 50,000 and a glass transition temperature Tg of at least 70° C., and the hydrophobic polymer having a Tg at least 40° C. lower than the Tg of the oligomer, wherein the weight of oligomer is 5 to 50 wt. % of the weight of oligomer plus hydrophobic polymer, and the aqueous emulsion is substantially free of adipic dihydrazide, and other hydrolyzable crosslinkers and has a minimum film forming temperature≤55° C. and on drying has a Koenig hardness of at least 40 sec.

17. A coated article according to claim 16, wherein the di- or higher-functional chain-extending monomers comprise 1,3-butanediol diacrylate, 1,4-butanediol diacrylate, 1,6-hexanediol diacrylate, ethylene glycol dimethacrylate, allyl methacrylate, vinyl trimethoxy silane or acetoacetoxyethyl methacrylate; the acid-functional free-radically polymerizable comonomer(s) comprise carboxyl groups; the oligomer has a number average molecular weight Mn of about 2,500 to about 5,000 and a glass transition temperature Tg of 70 to 125° C.; and the aqueous emulsion is solvent-free.

18. A coated article according to claim 16, wherein the substrate comprises wood, plastic, metal or a cementitious material.

19. A coated article according to claim 16, wherein the substrate comprises furniture.

20. The method for making an aqueous emulsion according to claim 1, wherein the other hydrolyzable crosslinkers include polyhydrazides, polyisocyanates, melamine, glycoluril, and polyamines.

21. The coating composition according to claim 2, wherein the other hydrolyzable crosslinkers include polyhydrazides, polyisocyanates, melamine, glycoluril, and polyamines.

22. The coated article according to claim 16, wherein the other hydrolyzable crosslinkers include polyhydrazides, polyisocyanates, melamine, glycoluril, and polyamines.

* * * * *